(12) United States Patent
Yingchun

(10) Patent No.: US 10,816,146 B2
(45) Date of Patent: *Oct. 27, 2020

(54) LED LIGHTING TUBE DEVICE AND METHOD

(71) Applicant: Argo Import-Export Ltd., Bloomfield Hills, MI (US)

(72) Inventor: Zhang Yingchun, Suzhou Industrial Park (CN)

(73) Assignee: Argo Import-Export Ltd., Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/900,111

(22) Filed: Jun. 12, 2020

(65) Prior Publication Data

US 2020/0300421 A1 Sep. 24, 2020

Related U.S. Application Data

(63) Continuation of application No. 15/881,328, filed on Jan. 26, 2018, now Pat. No. 10,697,593, which is a
(Continued)

(51) Int. Cl.
*F21K 9/27* (2016.01)
*F21S 4/20* (2016.01)
(Continued)

(52) U.S. Cl.
CPC ............... *F21K 9/27* (2016.08); *F21K 9/90* (2013.01); *F21S 4/20* (2016.01); *F21V 15/01* (2013.01); *F21V 23/005* (2013.01); *F21V 23/06* (2013.01); *F21V 25/04* (2013.01); *H01R 33/96* (2013.01); *H05B 45/00* (2020.01); *F21K 9/278* (2016.08); *F21V 3/062* (2018.02); *F21V 29/506* (2015.01); *F21Y 2103/10* (2016.08); *F21Y 2115/10* (2016.08)

(58) Field of Classification Search
CPC ....... F21K 9/27; F21S 4/20; F21S 4/22; F21S 4/24; F21V 7/005
See application file for complete search history.

(56) References Cited

U.S. PATENT DOCUMENTS 7,815,338 B2 * 10/2010 Siemiet .................. F21V 29/76
362/218
8,757,832 B2 * 6/2014 Kim .......................... F21K 9/27
362/217.01
(Continued)

*Primary Examiner* — William N Harris
(74) *Attorney, Agent, or Firm* — Kohn & Associates, PLLC

(57) ABSTRACT

An LED lighting tube including a heat-dissipating tubular envelope having an LED assembly directly affixed to an inner surface of the heat-dissipating tubular envelope. A method of making an LED lighting tube by providing a heat-dissipating tubular envelope, and affixing an LED assembly directly to an inner surface of the heat-dissipating tubular envelope with an adhesive layer. A method of providing heat-dissipation without a heat sink in an LED lighting tube by providing a heat-dissipating tubular envelope, affixing an LED assembly directly to an inner surface of the heat-dissipating tubular envelope with an adhesive layer, and dissipating heat through the heat-dissipating tubular envelope.

14 Claims, 6 Drawing Sheets

Related U.S. Application Data continuation of application No. 15/725,541, filed on Oct. 5, 2017, now Pat. No. 9,989,200, which is a continuation-in-part of application No. 14/887,468, filed on Oct. 20, 2015, now Pat. No. 9,810,384.

(60) Provisional application No. 62/065,959, filed on Oct. 20, 2014.

(51) Int. Cl.

| | | |
|---|---|---|
| *H01R 33/96* | (2006.01) | |
| *F21V 15/01* | (2006.01) | |
| *F21K 9/90* | (2016.01) | |
| *F21V 23/06* | (2006.01) | |
| *H05B 45/00* | (2020.01) | |
| *F21V 23/00* | (2015.01) | |
| *F21V 3/06* | (2018.01) | |
| *F21V 29/506* | (2015.01) | |
| *F21Y 103/10* | (2016.01) | |
| *F21Y 115/10* | (2016.01) | |
| *F21K 9/278* | (2016.01) | |
| *F21V 25/04* | (2006.01) | |

(56) References Cited

U.S. PATENT DOCUMENTS

| | | | |
|---|---|---|---|
| 9,625,129 B2 * | 4/2017 | Jiang | F21V 19/009 |
| 9,625,137 B2 * | 4/2017 | Li | F21K 9/278 |
| 9,920,887 B2 * | 3/2018 | Van Delden | F21K 9/90 |
| 2007/0103902 A1 * | 5/2007 | Hsiao | F21S 8/022 |
| | | | 362/240 |
| 2009/0290334 A1 * | 11/2009 | Ivey | F21V 29/70 |
| | | | 362/219 |
| 2012/0069556 A1 * | 3/2012 | Bertram | F21V 7/24 |
| | | | 362/217.14 |
| 2013/0033888 A1 * | 2/2013 | Van Der Wel | F21V 7/18 |
| | | | 362/555 |
| 2013/0170196 A1 * | 7/2013 | Huang | F21V 23/00 |
| | | | 362/221 |
| 2014/0009923 A1 * | 1/2014 | Wu | F21K 9/27 |
| | | | 362/218 |
| 2014/0078771 A1 * | 3/2014 | Chen | F21V 29/70 |
| | | | 362/555 |
| 2015/0345712 A1 * | 12/2015 | Purdy | F21K 9/60 |
| | | | 362/223 |
| 2016/0084449 A1 * | 3/2016 | Speer | F21K 9/66 |
| | | | 362/223 |
| 2016/0138767 A1 * | 5/2016 | Luo | F21K 9/27 |
| | | | 362/218 |

\* cited by examiner

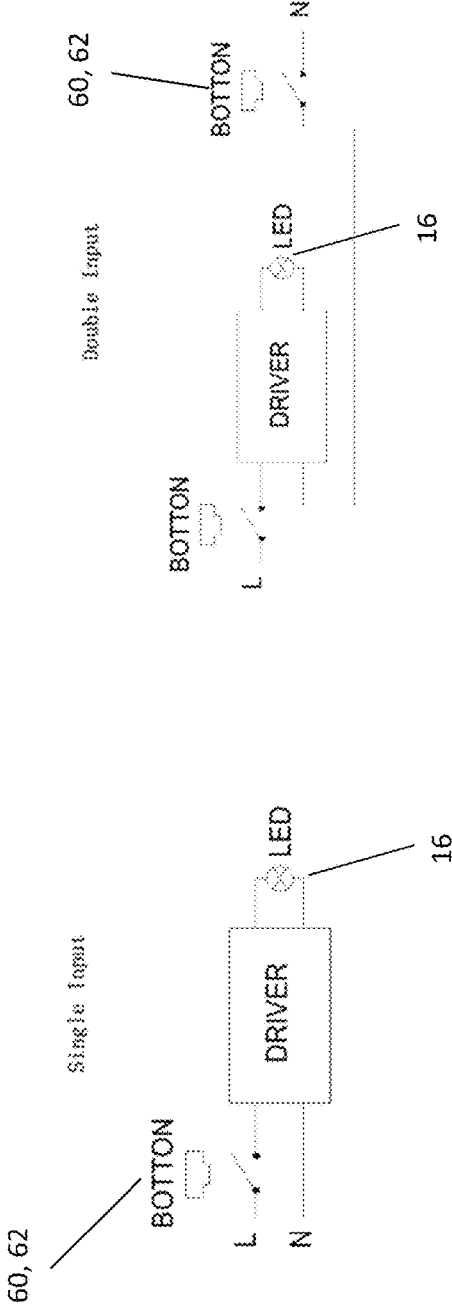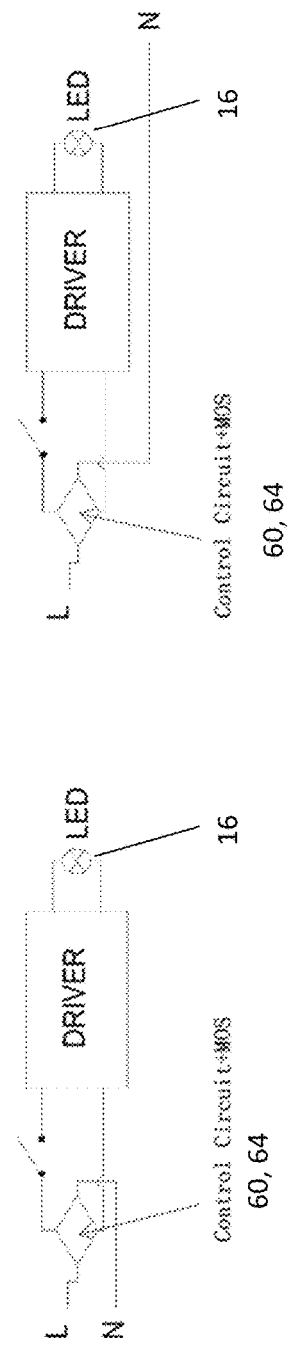
Fig. 5A
Fig. 5B
Fig. 5C
Fig. 5D

LED LIGHTING TUBE DEVICE AND METHOD

BACKGROUND OF THE INVENTION

1. Technical Field

The present invention relates to light-emitting diode (LED) based lighting tubes, and in particular to LED based lighting tubes for serving as replacements for fluorescent lighting tubes.

2. Background Art

LED lighting tubes have for many years been used as energy efficient replacements for conventional fluorescent lighting tubes. A typical LED lighting tube includes an LED assembly enclosed at least partially within a clear or frosted tubular envelope. The LED assembly includes a plurality of LEDs in electrical connection with a circuit board, which is usually attached to a heat sink or other heat dissipating device. The open ends of the tubular envelope are usually closed by end caps, which also provide electrical connection between the LED assembly and a power supply.

The mounting of the LED assembly within the tubular envelope engenders problems that have not been solved in the prior art. In many exemplary lighting tubes, such as those disclosed in U.S. Pat. No. 7,510,299 to Timmermans, et al., and U.S. Pat. No. 7,053,557 to Cross, et al., the LED assembly is attached to supports that are suspended from the end caps or from the interior of the envelope. This configuration is costly to construct and difficult to keep in proper alignment during shipping and installation of the LED lighting tube. It also limits the arc of illumination, since light emitted by the LEDs is blocked by the supporting structures, the circuit board, and the heat sink. In other exemplary lighting tubes, such as that disclosed in U.S. Pat. No. 7,815,338 to Siemiet, et al., the LED assembly interrupts the circumference of the tubular envelope, with the heat sink being situated outside of the envelope. In cross section, the envelope forms an incomplete circle, with free edges attaching to the heat sink or to another part of the LED assembly. This type of design excludes the use of desirable but delicate envelope materials such as thin glass or brittle plastic, because it is difficult or impossible to durably attach their free edges to the LED assembly without breakage. The design also limits the arc of emitted light with the bulky opaque structure of the heat sink. There is a need for an LED lighting tube of light and simple construction.

LED lighting tubes, and lighting tubes of all types, typically include a frosted film on the tubular envelope, to diffuse and reduce the harshness of the emitted light. Typical films include paints or powders, which are difficult to apply evenly, and which provide no mechanical protection for the envelope. There is a need for a lighting tube film that is readily applied in a consistent manner, and which protects the lighting tube.

SUMMARY OF THE INVENTION

The present invention provides for an LED lighting tube including a heat-dissipating tubular envelope having an LED assembly directly affixed to an inner surface of the heat-dissipating tubular envelope.

The present invention provides for a method of making an LED lighting tube, by providing a heat-dissipating tubular envelope, and affixing an LED assembly directly to an inner surface of the heat-dissipating tubular envelope with an adhesive layer.

The present invention also provides for a method of providing heat-dissipation without a heat sink in an LED lighting tube by providing a heat-dissipating tubular envelope, affixing an LED assembly directly to an inner surface of the heat-dissipating tubular envelope with an adhesive layer, and dissipating heat through the heat-dissipating tubular envelope.

DESCRIPTION OF THE DRAWINGS

Other advantages of the present invention are readily appreciated as the same becomes better understood by reference to the following detailed description when considered in connection with the accompanying drawings wherein:

FIG. 5A is a diagram of single input for a mechanical safety switch, FIG. 5B is a diagram of a double input for a mechanical safety switch, FIG. 5C is a diagram of a single input for an electronic safety switch, and FIG. 5D is a diagram of a double input for an electronic safety switch.

DETAILED DESCRIPTION OF THE INVENTION

Figure 1A:
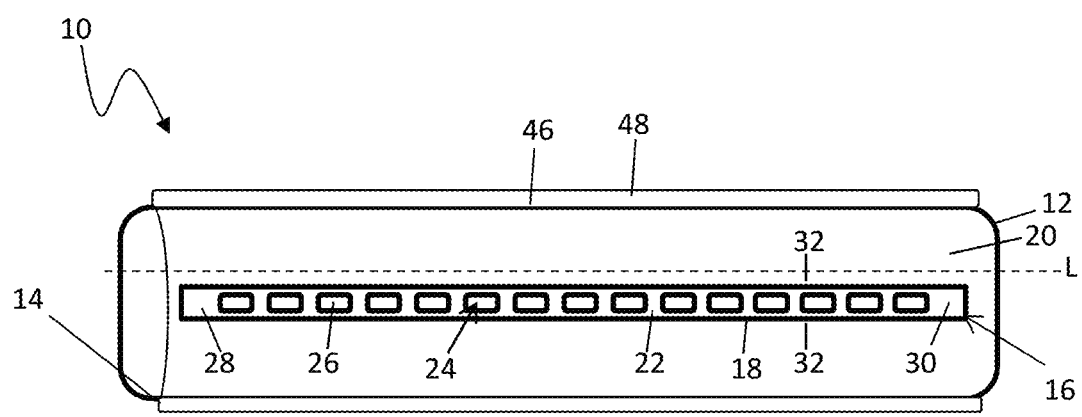
FIG. 1A shows a bottom elevation of an LED lighting tube according to the present invention.
Figure 1B:
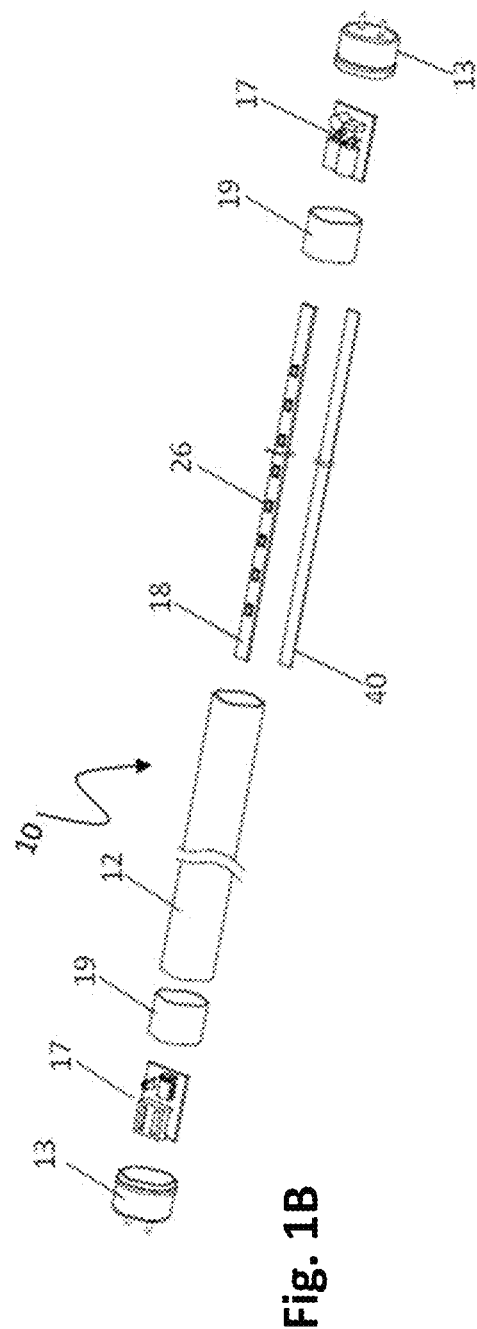
FIG. 1B shows an exploded view of an exemplary LED tube.

The present invention provides for LED lighting tubes, methods of making, methods of providing heat-dissipation without the need for an additional heat sink, and methods of preventing shocks to individuals inserting and removing LED lighting tubes through the use of a safety switch. More specifically, an LED lighting tube according to the present invention, generally shown at 10, includes essentially an envelope 12, preferably tubular in form, having an inner surface 14 defining an inner space 20 and being preferably circular in cross-section, and an exterior surface 46, opposite the inner surface 14, as shown in FIGS. 1A and 1B. The LED lighting tube 10 has a longitudinal axis designated as L in FIG. 1A. The inner space 20 preferably contains ambient atmosphere, but can alternatively be filled with any gas required for a specific use, as will be determined by one skilled in the art.

The envelope 12 is preferably constructed of glass as a single tubular unit. Alternatively, the envelope 12 can be constructed of any suitable clear or translucent plastic. The envelope 12 is a heat-dissipating envelope.

An LED assembly 16, extending along the longitudinal axis L of the envelope 12, includes an LED board 18, which has an upper surface 22 bearing an attached LED array 24. The LED array 24 includes a plurality of LEDs 26 in electrical interconnection. The LED board 18 contains electrical connections (not shown) among the LEDs 26, and an electrical connection to a power source. Preferably, the LED board 18 is an integrated circuit board, but it can alternatively be a wired circuit board.

The LED assembly 16 is affixed directly to the inner surface 14 of the envelope 12, preferably by an adhesive layer 40. The direct affixation of the LED assembly 16 to the inner surface 14 of the envelope 12 provides an LED lighting tube 10 that is both structurally robust and simple in construction, because it requires no supporting hardware or alignment procedure for suspension of the LED assembly 16 within the envelope 12. Direct mounting to the envelope 12 also allows the envelope itself to act as a heat-dissipating device, eliminating the need for a heat sink. An LED lighting tube 10 according to the present invention also provides a wider arc of emitted light than LED lighting tubes that incorporate a bulky heat sink that interrupts the envelope 12 with an extensive opaque region. Arcs as broad as 330° are produced by LED lighting tubes of the present invention. The elimination of a heat sink and supporting hardware, and the resulting reduction in complexity and increase in the arc of illumination, are all advantages of the present invention over LED lighting tubes of the prior art.

In the LED array 24, the LEDs 26 are preferably arranged as at least one linear string of LEDs 26, connected in series, although parallel connections are also contemplated. The LED array 24 can include a plurality of linear strings of LEDs 26 (not shown), the strings preferably being connected in parallel. Non-linear clusters of LEDs 26, arranged in any suitable distribution along the length of the LED board 18, are also within the scope of the present invention.

The preferred LED 26 is a surface mount LED, most preferably SMD 4014. LEDs of other types, as well as LEDs emitting wavelengths of light other than white, are also within the scope of the invention. The other colors include, but are not limited to, pink, blue, yellow, green, red, orange, infrared, and ultraviolet.

The LED board 18 also includes a first end 28 in electrical communication with a first electrical connector 50 and a second end 30 in electrical communication with a second electrical connector 52, each electrical connector 50, 52, being connectable, to an electrical receptacle of a light fixture. Preferably, the connection is to an electrical receptacle made by bi-pin male connectors situated in an end cap 13, for connecting to corresponding conventional fluorescent tube sockets (not shown).

Figure 1C:
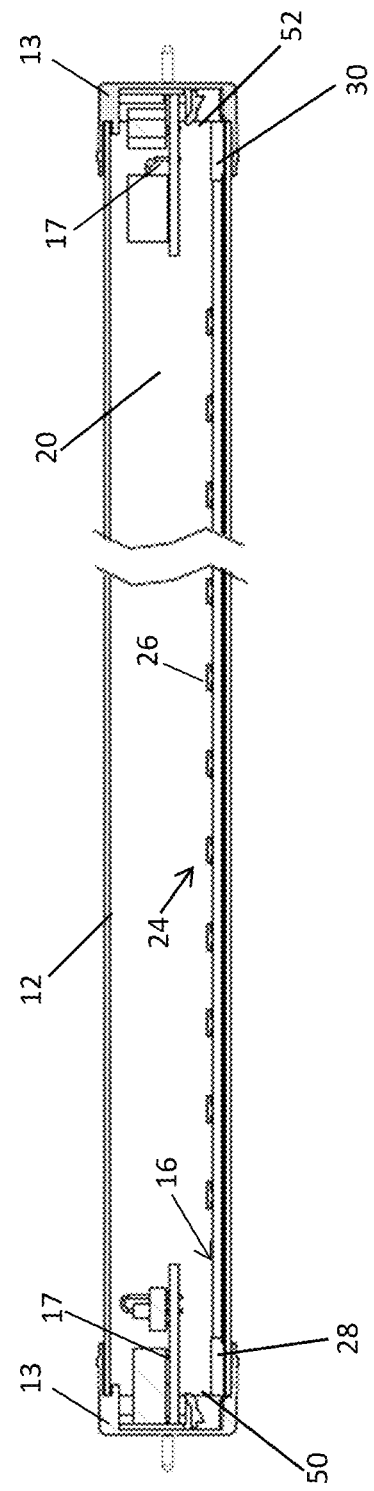
FIG. 1C shows a longitudinal section of the LED lighting tube.

The LED board 18 can optionally include voltage and current regulating circuits, preferably in the form of integrated circuits incorporated into the LED board (not shown). Alternatively or additionally, one or more of these circuits, if included, can be situated at any other suitable location within the LED lighting tube 10, such as the end cap 13. In an exemplary embodiment shown in FIGS. 1B and 1C, regulatory circuits are distributed among drivers 17, each driver being situated within a protective sleeve 19 adjacent to each end cap 13. The components and layout of any included voltage and current regulating circuits will depend on the voltage and current supply and needs of a particular LED lighting tube 10, and are readily determined by one skilled in the art. In another alternative embodiment, no voltage or current regulating circuits are included in the LED lighting tube 10, and, if required, they are situated at any suitable site exterior to the LED lighting tube 10, such as a lighting fixture.

The LED board 18 preferably extends along approximately the entire length of the LED assembly 16, but it can alternatively extend along only a portion of the length. The LED board 18 can additionally or alternatively cover one or both lateral sides 32 of the LED assembly (not shown), to provide diverse angles of emitted light.

In the preferred embodiment, the LED board 18 itself provides sufficient heat dissipation to prevent degradation of the structure or performance of the LEDs 26, and no heat dissipating base or other heat sink structure is required. Aluminum construction of the LED board 18 is therefore preferred, although other heat-conducting compositions can alternatively be used, such as, but not limited to, aluminum, aluminum alloy, steel, steel alloy, copper, and copper alloy.

Figure 2A:
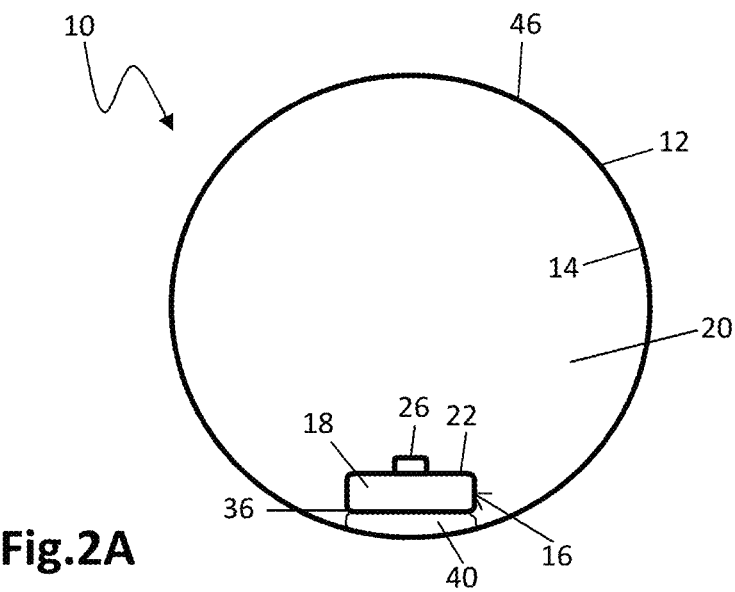
FIG. 2A shows a cross section of an LED lighting tube according to the present invention, including an LED board affixed directly to the envelope, with components not drawn to scale.
Figure 2B:
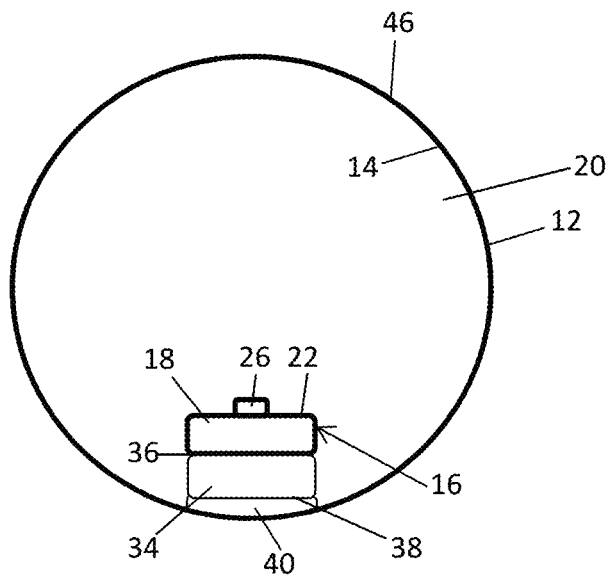
FIG. 2B shows a cross section of an LED lighting tube, including an LED assembly with a heat-dissipating base, affixed to the envelope, with components not drawn to scale.

The present invention also encompasses alternative embodiments that do include a heat-dissipating base 34, as shown in FIG. 2B. The heat-dissipating base 34 is preferably constructed of aluminum foil, but can also consist of any suitable thickness of aluminum, aluminum alloy, steel, steel alloy, copper, copper alloy, mixtures thereof, or any heat-dissipating material known in the art. The heat-dissipating base 34 can be affixed to the lower side 36 of the LED board 18, i.e., the side opposite the LED array 24, by means of adhesive, welding, or any other joining means known in the art. Alternatively, the heat-dissipating base 34 can be formed as an integral component (not shown) of the LED board 18. In embodiments having a heat-dissipating base 34, the preference for a heat-dissipating LED board 18 is diminished, and less heat-conductive compositions such as polycarbonate can be utilized in the construction of the LED board 18.

The LED assembly 16 can be affixed to the inner surface 14 of the envelope 12 by means of an adhesive layer 40 as shown in FIGS. 2A and 2B. The adhesive layer can include epoxy resin, silicone adhesive (preferably neutral cure silicone adhesive), any double-sided adhesive tape, or any other adhesive of which as sufficient strength and durability, as well as sufficient heat transfer properties. In the preferred embodiment, which lacks a heat-dissipating base 34, a lower side 36 of the LED board 18 is affixed directly to the inner surface 14 of the envelope 12, as shown in FIG. 2A. In alternative embodiments including a heat dissipating base 34, the lower side 38 of the base 34 is affixed to the inner surface 14 of the envelope 12, as shown in FIG. 2B. The adhesive layer 40 covers as much area of the inner surface 14 as required to secure the LED assembly 16, and can if necessary extend beyond the edges of the LED assembly 16 (not shown).

The LED assembly 16 is preferably affixed to the envelope 12 at a point opposite the direction in which light emission is to be directed. Multiple LED assemblies 18 can also be affixed at different points on a single envelope 12, to increase the arc and intensity of light emission (not shown).

An LED lighting tube 10 according to the present invention can be of any diameter and length known in the art, and preferably of diameters and lengths identical to those known for conventional fluorescent tubes. These include, but are not limited to, diameters of ¼", ½", ⅝", 1", and 1½" known in the art, respectively, as T2, T4, T5, T8, and T12; and lengths of 6", 9", 12", 18", 48", and 96". Scaling the LED lighting tube 10 to match conventional fluorescent tubes facilitates the replacement of existing fluorescent tubes with LED lighting tubes 10 according to the present invention.

It is preferred that the LED lighting tube 10 does not include additional features such as additional coatings or films (other than those described herein) to keep the cost of the device minimal and to keep the device easy to manufacture.

The illustrated embodiments of the LED lighting tube 10 include linear envelopes 12 and linear LED assemblies 18, but the present invention also encompasses non-linear components such as envelopes 12 and LED assemblies 18 formed as rings, loops, spirals, rectilinear shapes (not shown), and any other achievable geometric form.

Figure 4:
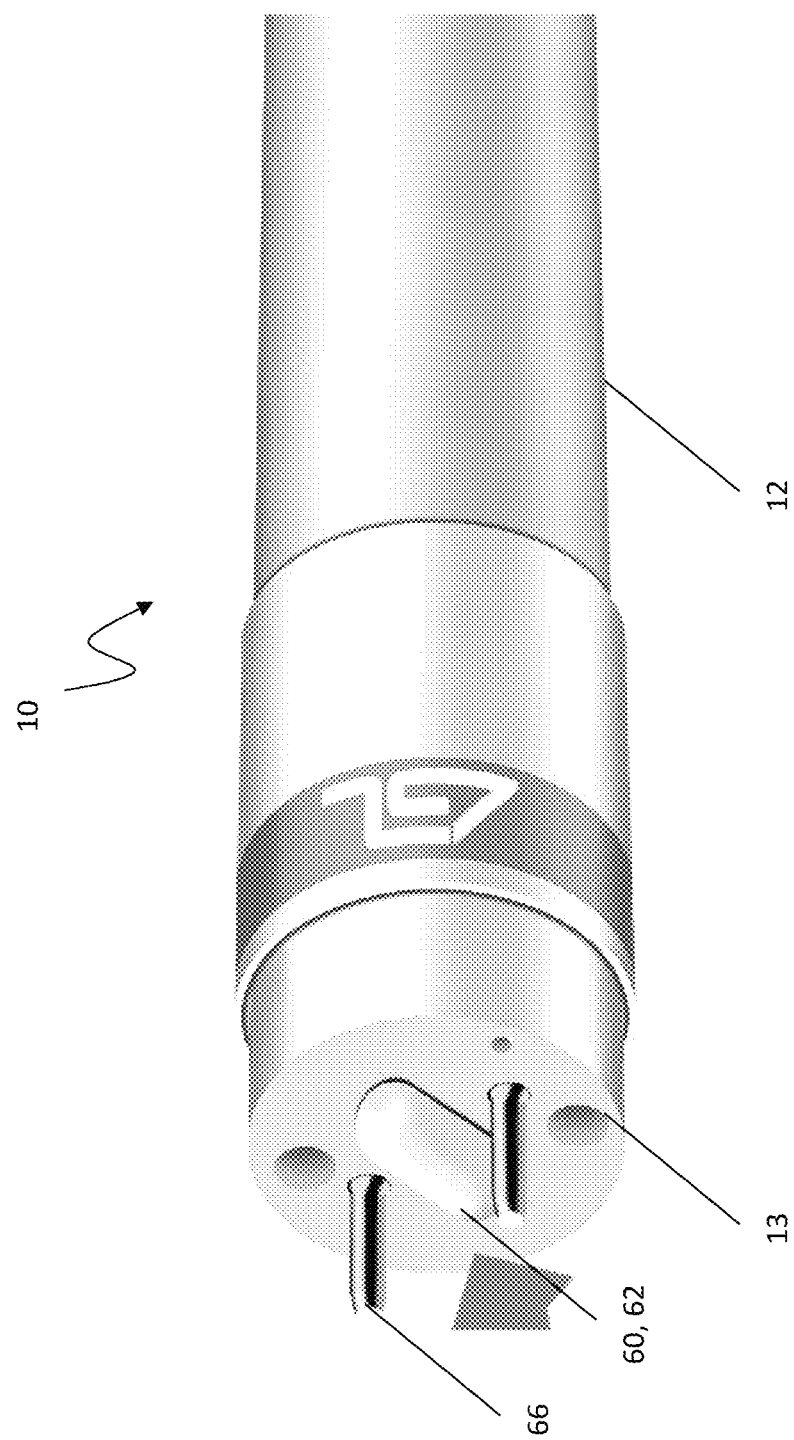
FIG. 4 is a side perspective view of an LED lighting tube including a button safety switch.

The LED lighting tube 10 can further include a safety switch 60 to ensure that the LED lighting tube 10 can only be operated and turned on when it is properly placed inside an electrical socket (such as a tombstone socket), activating the safety switch 60. The safety switch 60 is located at any suitable location on the end caps 13, such as between bi-pins 66. The safety switch 60 can be included in one end cap 13 or both end caps 13. In one embodiment, the safety switch 60 is a mechanical switch 62, shown in FIG. 4 in the shape of a button. A diagram of the mechanical switch 62 is shown in FIGS. 5A and 5B. In another embodiment, the safety switch is an electronic switch 64 that includes a sensor connected to a circuit. A diagram of the electronic switch 64 is shown in FIGS. 5C and 5D. Prior art LED lighting tubes use ballasts, which are not required with the safety switch 60 in the present invention.

The present invention provides for a method of preventing shocks to an individual inserting or removing an LED lighting tube from an electrical socket, by an individual inserting or removing the LED lighting tube 10 from an electrical socket, providing power to the LED lighting tube 10 only when the safety switch 60 is activated, and preventing shocks to the individual. The safety switch 60 can be either the mechanical switch 62 or electronic switch 64 described above. By using the safety switch 60, injuries and deaths can be prevented to individuals inserting or removing the LED lighting tube 10 because power is not supplied until the safety switch 60 is fully activated upon insertion, and power is cut as soon as the safety switch 60 is deactivated upon removal. This method can also include any of the other steps described herein.

The present invention also provides a method for making an LED lighting tube 10, including the steps of providing a tubular envelope 12, situating an LED assembly 16 on an inner surface 14 of the of the tubular envelope 12, and affixing the LED assembly 16 directly to the inner surface 14 of the tubular envelope 12 with an adhesive layer 40. Each of these steps has been described above. Preferably, the LED lighting tube 10 does not include other elements than what is described herein.

The present invention also provides for a method of providing heat-dissipation without a heat sink in an LED lighting tube 10, by providing a tubular envelope 12, affixing an LED assembly 16 directly to an inner surface 14 of the tubular envelope 12 with an adhesive layer 40, and dissipating heat through the tubular envelope 12. Also, as described above, the materials of the LED board allow it to provide heat-dissipation to the envelope as well. Preferably, the LED lighting tube 10 does not include other elements than what is described herein.

Figure 3A:
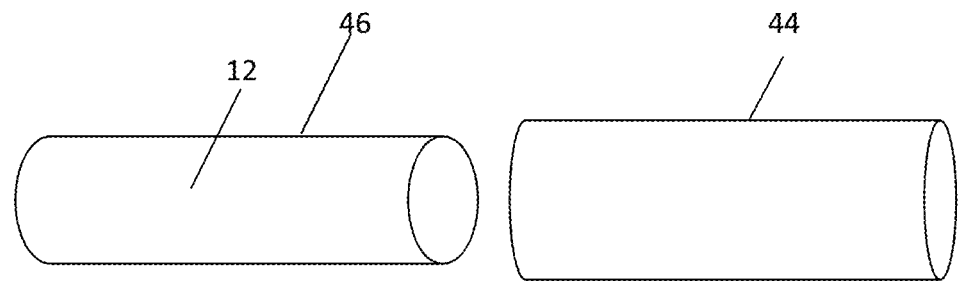
FIG. 3A shows a tubular envelope and a plastic film sleeve, prior to heat treatment.
Figure 3B:
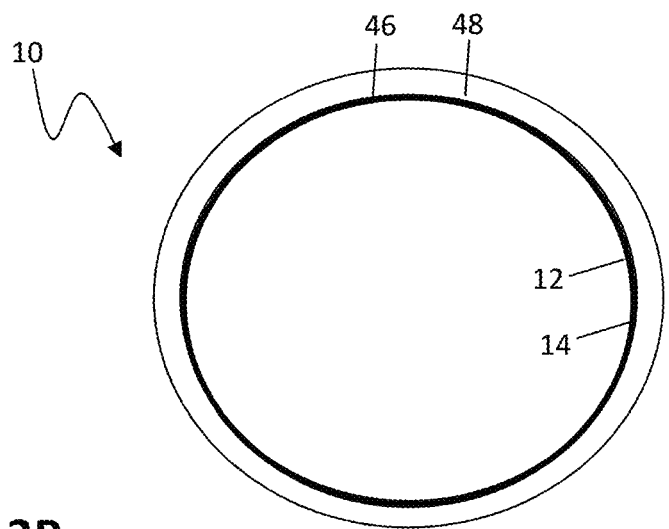
FIG. 3B shows a cross section of a tubular envelope, including a light diffusing and protective film according to the present invention, with components not drawn to scale.

The present invention also includes a method for adding a film to a lighting tube, such as an LED lighting tube 10, with a light-diffusing and protective film 48. The process is shown in FIGS. 3A and 3B. The process includes the steps of situating a plastic film sleeve 44 about an exterior surface 46 of an envelope 12 of a lighting tube; heat-treating the plastic film sleeve 44; and bonding the plastic film sleeve 44 as a light-diffusing and protective film 48 upon the exterior surface 46 of the envelope 12. The lighting tube can be a lighting tube 10 according to the present invention, or any other suitable lighting tube or bulb (not shown). This process produces a light-diffusing and protective film 48 that is uniform, and that provides physical support for the envelope 12, to reduce the risk of breakage, and the scattering of glass shards should breakage occur.

The preferred material for the film sleeve 44 is milk-white poly film, which, after heat treatment, produces a light-diffusing and protective film 48 with a milk-white frosted finish on the exterior surface 46 of the envelope 12. An exemplary film material is polyethylene terephthalate, and an exemplary heat treatment is treatment at 85° C.

The plastic film sleeve 44 can be of any shape and circumference that sufficiently conforms to the circumference of the envelope 12 to provide a tightly-bonded, wrinkle-free film after heat treatment. Tinted plastic film sleeves 44 can alternatively be utilized, to add warmer, cooler, or decorative colors to the emitted light. The plastic film need not be provided as a film sleeve 44 but can instead be provided as an open sheet that is wrapped about the exterior surface 46 of the envelope 12 prior to heat treatment. The present invention provides for an LED lighting tube 10 including the plastic film sleeve 44 attached to the exterior surface 46 of the envelope 12.

The film-coating process of the present invention is not limited to LED lighting tubes 10, and is applicable to other types of lighting tubes, such as conventional fluorescent tubes.

The present invention also provides a method for illuminating a space with an LED lighting tube 10, including the steps of providing a tubular glass envelope 12, situating an LED assembly 16 on an inner surface 14 of the of the envelope 12, affixing the LED assembly 16 to the inner surface 14 of the envelope 12 with an adhesive layer 40, connecting a first electrical connector 50 to a first end 28 of the LED assembly 16, connecting a second end 30 of the LED assembly 16 to a second electrical connector 52, and connecting the first and second electrical connectors 52, 53, to a lighting fixture (not shown). Preferably, the LED lighting tube provides up to 330° arcs of light.

In its preferred embodiments, an LED lighting tube 10 according to the present invention is simpler, sturdier, and more broadly illuminating than LED lighting tubes of the prior art, because it includes an LED assembly 16 that is affixed directly to the inner surface 14 of the envelope 12, and requires no heat dissipating base 34. Embodiments of the LED lighting tube 10 that additionally include a light diffusing and protective film 48 are safer than those of the prior art, which include only surface deposited powders and paints.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. An LED lighting tube, comprising:
   a heat-dissipating tubular envelope including an LED assembly including a substantially flat LED board having an LED array attached to an upper surface of said LED board and an opposite base surface of said LED board entirely and directly affixed to a curved inner surface of said heat-dissipating tubular envelope and an adhesive layer consisting of a non-insulating adhesive that extends an entire length of said LED assembly between said base surface of said LED board and said curved surface of said heat-dissipating tubular envelope, wherein open ends of said heat-dissipating tubular envelope are closed by end caps, said LED board including a first end in electrical communication with a first electrical connector and a second end in electrical communication with a second electrical connector, wherein said first electrical connector and said second electrical connector are connectable to an electrical receptacle of a light fixture through said end caps, wherein an inner space of said heat-dissipating tubular envelope includes ambient atmosphere, wherein said LED array emits light chosen from the group consisting of white light, pink light, blue light, yellow light, green light, red light, orange light, infrared light, and ultraviolet light, wherein said heat-dissipating tubular envelope has a diameter chosen from the group consisting of ¼", ½", ⅝", 1", and 1½", and a length chosen from the group consisting of 6", 9", 12", 18", 48", and 96", and further including a protective film operatively attached to said heat-dissipating tubular envelope.

2. The LED lighting tube of claim 1, wherein said heat-dissipating tubular envelope is made of a material selected from the group consisting of glass and plastic.

3. The LED lighting tube of claim 1, wherein said LED board includes voltage and current regulating circuits.

4. The LED lighting tube of claim 1, wherein said LED board covers at least one lateral side of said LED assembly.

5. The LED lighting tube of claim 1, wherein said LED board further includes a heat-dissipating base affixed to a lower side of said LED board.

6. The LED lighting tube of claim 5, wherein said heat-dissipating base is made of a material chosen from the group consisting of aluminum foil, aluminum, aluminum alloy, steel, steel alloy, copper, copper alloy, and mixtures thereof.

7. The LED lighting tube of claim 5, wherein said LED board is made of polycarbonate.

8. The LED lighting tube of claim 1, wherein said adhesive layer is a material chosen from the group consisting of epoxy resin, silicone adhesive, and double-sided adhesive tape.

9. The LED lighting tube of claim 1, wherein said LED assembly includes an LED board made of a material chosen from the group consisting of aluminum, aluminum alloy, steel, steel alloy, copper, and copper alloy.

10. The LED lighting tube of claim 1, wherein said protective film is further defined as a heat-treated plastic film attached to an exterior surface of said heat-dissipating tubular envelope.

11. The LED lighting tube of claim 10, wherein said heat-treated plastic film is made of polyethylene terephthalate.

12. A method of making an LED lighting tube, including the steps of:
providing a heat-dissipating tubular envelope; and
affixing a surface of a base portion an LED assembly directly to a curved inner surface of the heat-dissipating tubular envelope with an adhesive layer consisting of a non-insulating adhesive that extends an entire length of the LED assembly, wherein the LED assembly includes an LED board having an LED array attached to an upper surface opposite of the base portion, wherein open ends of the heat-dissipating tubular envelope are closed by end caps, the LED board including a first end in electrical communication with a first electrical connector and a second end in electrical communication with a second electrical connector, wherein the first electrical connector and the second electrical connector are connectable to an electrical receptacle of a light fixture through the end caps, wherein an inner space of the heat-dissipating tubular envelope includes ambient atmosphere, wherein the LED array emits light chosen from the group consisting of white light, pink light, blue light, yellow light, green light, red light, orange light, infrared light, and ultraviolet light, wherein the heat-dissipating tubular envelope has a diameter chosen from the group consisting of ¼", ½", ⅝", 1", and 1½", and a length chosen from the group consisting of 6", 9", 12", 18", 48", and 96" and further including a protective film operatively attached to the heat-dissipating tubular envelope.

13. The method of claim 12, wherein the adhesive layer is a material chosen from the group consisting of epoxy resin, silicone adhesive, and double-sided adhesive tape.

14. A method of providing heat-dissipation without a heat sink in an LED lighting tube, including the steps of:
providing a heat-dissipating tubular envelope;
affixing a surface of a base of an LED assembly directly to an inner surface of the heat-dissipating tubular envelope with an adhesive layer consisting of a non-insulating adhesive that extends an entire length of the LED assembly, wherein the LED assembly includes an LED board having an LED array attached to an upper surface opposite of the base portion, wherein open ends of the heat-dissipating tubular envelope are closed by end caps, the LED board including a first end in electrical communication with a first electrical connector and a second end in electrical communication with a second electrical connector, wherein the first electrical connector and the second electrical connector are connectable to an electrical receptacle of a light fixture through the end caps, wherein an inner space of the heat-dissipating tubular envelope includes ambient atmosphere, wherein the LED array emits light chosen from the group consisting of white light, pink light, blue light, yellow light, green light, red light, orange light, infrared light, and ultraviolet light, wherein the heat-dissipating tubular envelope has a diameter chosen from the group consisting of ¼", ½", ⅝", 1", and 1½", and a length chosen from the group consisting of 6", 9", 12", 18", 48", and 96", and further including a protective film operatively attached to the heat-dissipating tubular envelope; and
dissipating heat through the heat-dissipating tubular envelope.

* * * * *